United States Patent
Wietfeldt et al.

(10) Patent No.: US 9,294,202 B1
(45) Date of Patent: Mar. 22, 2016

(54) ADJUSTING APPLICATION PARAMETERS FOR INTERFERENCE MITIGATION

(71) Applicant: QUALCOMM Incorporated, San Diego, CA (US)

(72) Inventors: Richard Dominic Wietfeldt, San Diego, CA (US); George Chrisikos, San Diego, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/494,998

(22) Filed: Sep. 24, 2014

(51) Int. Cl.
| | |
|---|---|
| H04B 1/00 | (2006.01) |
| H04B 15/00 | (2006.01) |
| H04B 15/02 | (2006.01) |
| H04B 17/23 | (2015.01) |
| H04W 72/08 | (2009.01) |

(52) U.S. Cl.
CPC .............. *H04B 15/02* (2013.01); *H04B 17/23* (2015.01); *H04W 72/082* (2013.01)

(58) Field of Classification Search
USPC .............. 455/41.2, 63.1, 67.11, 67.13, 67.15, 455/67.7, 68, 69, 522, 557, 114.2, 296, 455/552.1, 553.1
See application file for complete search history.

(56) References Cited

U.S. PATENT DOCUMENTS

| | | | |
|---|---|---|---|
| 7,801,484 B2 * | 9/2010 | Hughes ................... | H04B 15/00 455/127.4 |
| 8,238,971 B2 | 8/2012 | Terlizzi | |
| 8,284,721 B2 | 10/2012 | Chen et al. | |
| 8,396,003 B2 | 3/2013 | Leinonen et al. | |
| 8,417,983 B2 * | 4/2013 | Machnicki ................ | G06F 1/08 326/93 |
| 8,553,612 B2 * | 10/2013 | Alexandre ............ | H04W 48/18 370/328 |
| 8,599,709 B2 * | 12/2013 | Chen ......................... | H04L 1/24 370/252 |
| 8,693,569 B2 * | 4/2014 | Chen ....................... | H04B 1/406 375/147 |
| 8,724,649 B2 | 5/2014 | Tal et al. | |
| 8,731,568 B1 * | 5/2014 | Epstein ................. | H04W 40/00 370/208 |

(Continued)

FOREIGN PATENT DOCUMENTS

| | | |
|---|---|---|
| EP | 1432154 A2 | 6/2004 |
| WO | 2007013900 A2 | 2/2007 |
| WO | 2014130137 A1 | 8/2014 |

OTHER PUBLICATIONS

International Search Report and Written Opinion for PCT/US2015/045020, mailed Nov. 9, 2015, 11 pages.

*Primary Examiner* — Tuan A Tran
(74) *Attorney, Agent, or Firm* — Withrow & Terranova, PLLC

(57) ABSTRACT

Aspects of adjusting application parameters for interference mitigation are disclosed. In one aspect, a computing device is provided that employs a control system configured to detect and mitigate electromagnetic interference (EMI) generated within the computing device. More specifically, the control system is configured to detect possible EMI conditions and adjust parameters within the computing device to mitigate such EMI. In this manner, the computing device includes an aggressor application and a victim receiver. The control system is configured to analyze performance tradeoffs based on an acceptable performance level of the aggressor application and the performance degradation experienced by the victim receiver. Based on such analysis, the control system is configured to adjust parameters associated with the aggressor application to mitigate the EMI. Thus, the control system provides designers with an additional tool that may reduce the performance degradation of the victim receiver attributable to the EMI.

30 Claims, 7 Drawing Sheets

(56) References Cited

U.S. PATENT DOCUMENTS

| | | | |
|---|---|---|---|
| 8,995,321 B2* | 3/2015 | Medapalli | H04W 72/1215 370/310 |
| 8,995,553 B2* | 3/2015 | Chen | H04L 5/0064 375/267 |
| 9,042,361 B2* | 5/2015 | Makhlouf | H04W 72/02 370/338 |
| 9,113,349 B2* | 8/2015 | Tolentino | H04B 15/00 |
| 9,179,350 B2* | 11/2015 | Yao | H04W 72/082 |
| 2009/0138745 A1 | 5/2009 | Dorsey et al. | |
| 2013/0235906 A1 | 9/2013 | Kim et al. | |
| 2013/0331137 A1* | 12/2013 | Burchill | H04W 52/243 455/501 |
| 2014/0256247 A1* | 9/2014 | Wietfeldt | H04W 4/00 455/39 |
| 2015/0133185 A1* | 5/2015 | Chen | H04W 72/1215 455/552.1 |

\* cited by examiner

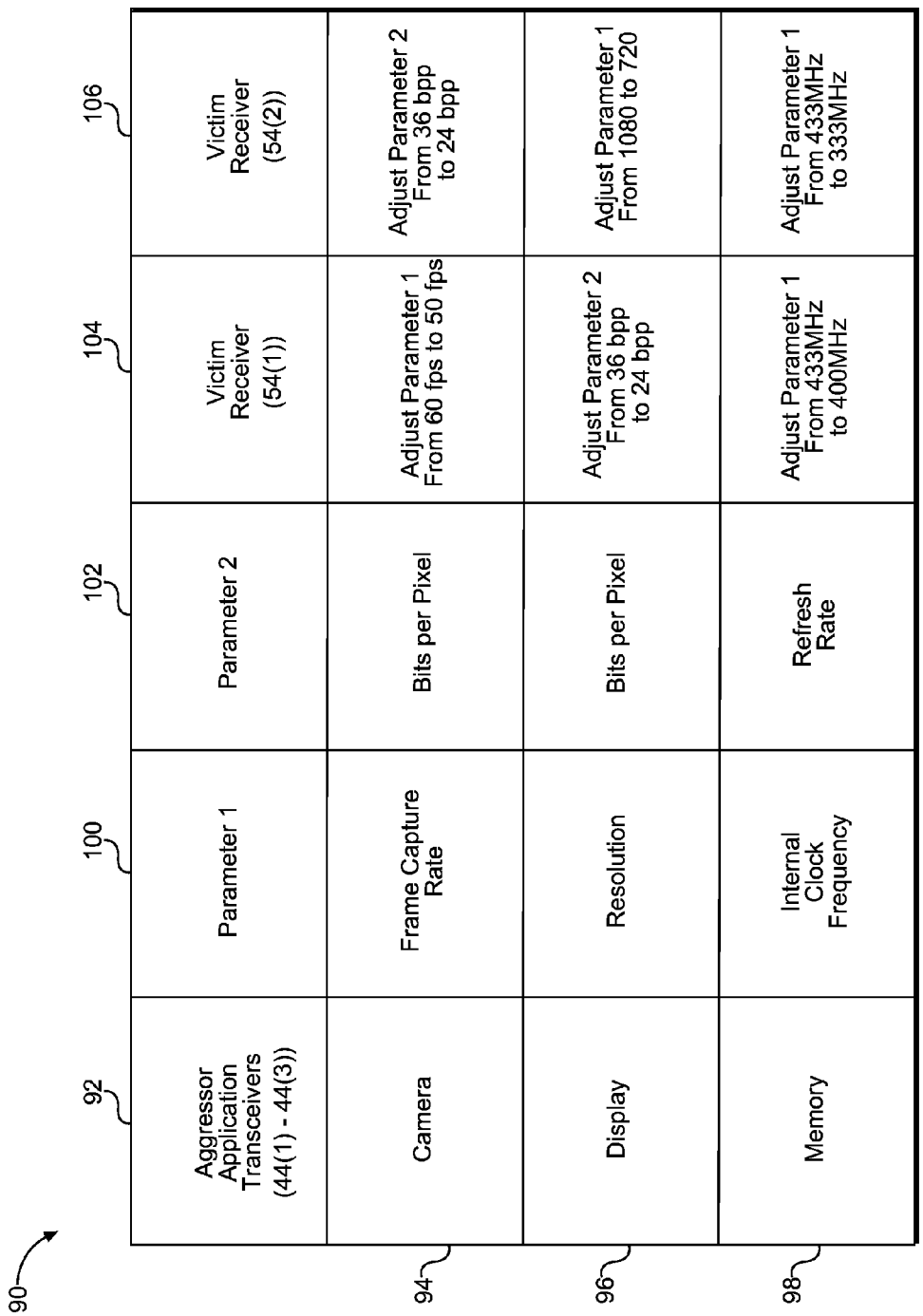

ADJUSTING APPLICATION PARAMETERS FOR INTERFERENCE MITIGATION

BACKGROUND

I. Field of the Disclosure

The technology of the disclosure relates generally to electromagnetic interference (EMI) of receivers, and particularly to mitigating effects of such EMI.

II. Background

Mobile computing devices, such as mobile phones and computer tablets, have become increasingly prevalent in contemporary society. These mobile computing devices are commonly used for a multitude of everyday functions. For example, a mobile computing device may be used to make phone calls or send e-mail messages via a wireless modem. The same mobile computing device may also perform other functions using function-specific hardware applications, such as taking pictures with an integrated camera or viewing a video on an integrated display.

In this regard, each hardware application communicates with a central processor configured to execute instructions related to such functions. More specifically, data and clock signals are exchanged between each hardware application and a central processor during function execution. As the frequency of such signals increases, a greater amount of electromagnetic emissions is generated at each clock edge. This increase in electromagnetic emissions causes electromagnetic interference (EMI) that degrades the performance of other circuitry within the mobile computing device.

Additionally, continued miniaturization of mobile computing devices, combined with increased frequencies, further exacerbates the effects of EMI. In particular, as the circuit area within a mobile computing device decreases, circuit elements are placed closer together. This closer proximity of circuit elements increases the effects of EMI generated by the greater electromagnetic emissions resulting from higher or lower frequencies. Therefore, it would be advantageous to provide designers with additional tools to successfully mitigate the effects of EMI within mobile computing devices as frequency ranges continue to increase while device sizes decrease.

SUMMARY OF THE DISCLOSURE

Aspects disclosed in the detailed description include adjusting application parameters for interference mitigation. In one aspect, a computing device is provided that employs a control system configured to detect and mitigate electromagnetic interference (EMI) generated within the computing device. More specifically, the control system is configured to detect possible EMI conditions and adjust parameters within the computing device to mitigate such EMI. In this manner, the computing device includes an aggressor application and a victim receiver. The control system is configured to analyze performance tradeoffs based on an acceptable performance level of the aggressor application and performance degradation experienced by the victim receiver. Based on such analyses, the control system is configured to adjust parameters associated with the aggressor application to mitigate the EMI. Thus, the control system provides designers with an additional tool that may reduce the performance degradation of the victim receiver attributable to the EMI.

In this regard in one aspect, a computing device is disclosed. The computing device comprises an aggressor application transceiver. The computing device further comprises a central processor communicatively coupled to the aggressor application transceiver via a wired interface. The computing device further comprises a victim receiver. The computing device further comprises a control system communicatively coupled to the aggressor application transceiver and the victim receiver. The control system is configured to determine if the victim receiver experiences EMI as a result of the wired interface. The control system is further configured to determine an acceptable performance level of the aggressor application transceiver based on a performance tradeoff. The control system is further configured to adjust one or more parameters from among a plurality of parameters associated with the aggressor application transceiver to mitigate the EMI experienced by the victim receiver and keep the aggressor application transceiver operating at or above the acceptable performance level.

In another aspect, a method for mitigating EMI of a victim receiver caused by an aggressor application transceiver is disclosed. The method comprises determining if a victim receiver experiences EMI as a result of a wired interface coupling an aggressor application transceiver to a central processor. The method further comprises determining an acceptable performance level of the aggressor application transceiver based on a performance tradeoff. The method further comprises adjusting one or more parameters from among a plurality of parameters associated with the aggressor application transceiver to mitigate the EMI experienced by the victim receiver and keep the aggressor application transceiver operating at or above the acceptable performance level.

In another aspect, a mobile device is disclosed. The mobile device comprises an aggressor camera. The mobile device further comprises a central processor communicatively coupled to the aggressor camera via a wired interface. The mobile device further comprises a victim receiver. The mobile device further comprises a control system communicatively coupled to the aggressor camera and the victim receiver. The control system is configured to determine if the victim receiver experiences EMI as a result of the wired interface. The control system is further configured to determine an acceptable performance level of the aggressor camera based on a performance tradeoff. The control system is further configured to adjust one or more parameters from among a plurality of parameters associated with the aggressor camera to mitigate the EMI experienced by the victim receiver and keep the aggressor camera operating at or above the acceptable performance level.

In another aspect, a non-transitory computer-readable medium having stored thereon computer executable instructions which, when executed by a processor, cause the processor to determine if a victim receiver experiences EMI as a result of a wired interface coupling an aggressor application transceiver to a central processor. The computer executable instructions further cause the processor to determine an acceptable performance level of the aggressor application transceiver based on a performance tradeoff. The computer executable instructions further cause the processor to adjust one or more parameters from among a plurality of parameters associated with the aggressor application transceiver to mitigate the EMI experienced by the victim receiver and keep the aggressor application transceiver operating at or above the acceptable performance level.

BRIEF DESCRIPTION OF THE FIGURES

FIG. 5 is a diagram of an exemplary database entry used by the control system employed in the computing device of FIG. 3.

DETAILED DESCRIPTION

Figure 1:
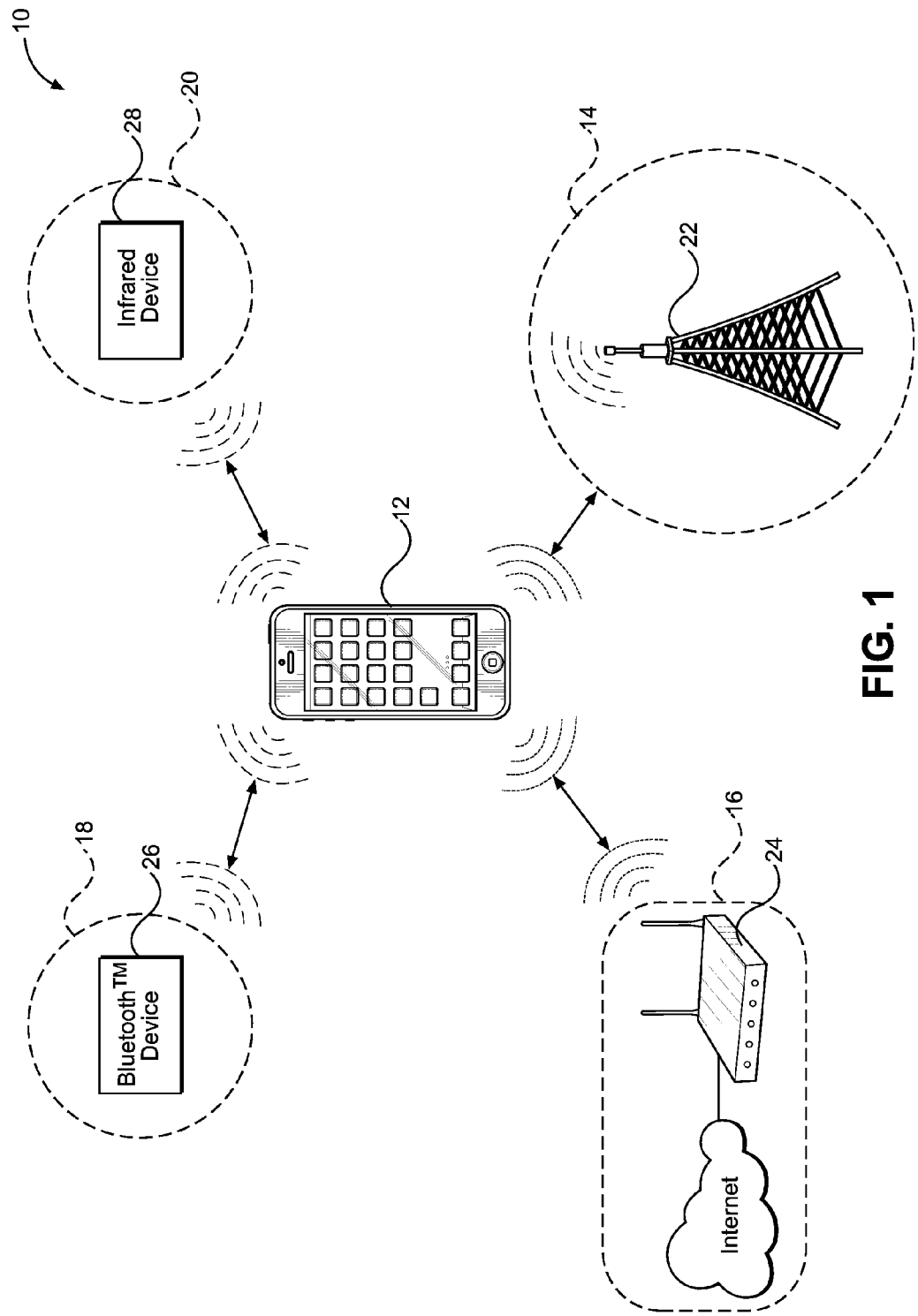
FIG. 1 is an illustration of an exemplary mobile computing device in a communications environment employing a plurality of networks.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include adjusting application parameters for interference mitigation. In one aspect, a computing device is provided that employs a control system configured to detect and mitigate electromagnetic interference (EMI) generated within the computing device. More specifically, the control system is configured to detect possible EMI conditions and adjust parameters within the computing device to mitigate such EMI. In this manner, the computing device includes an aggressor application and a victim receiver. The control system is configured to analyze performance tradeoffs based on an acceptable performance level of the aggressor application and performance degradation experienced by the victim receiver. Based on such analyses, the control system is configured to adjust parameters associated with the aggressor application to mitigate the EMI. Thus, the control system provides designers with an additional tool that may reduce the performance degradation of the victim receiver attributable to the EMI.

Before addressing exemplary aspects of the present disclosure, additional material is provided about the nature of EMI. In this regard, FIG. 1 illustrates a simplified diagram of an exemplary communications environment 10 that includes a mobile computing device 12 operating with a plurality of networks 14, 16, 18, and 20. The mobile computing device 12 communicates with each of the networks 14, 16, 18, and 20 separately, as the networks 14, 16, 18, and 20 each employ a different communications technology. For example, the network 14 includes a cellular base station 22 designed to support functions such as cellular phone and data communications with the mobile computing device 12. The network 16 is configured to support wireless fidelity ("Wi-Fi") communications, allowing the mobile computing device 12 to connect to other networks, such as the Internet, by way of a Wi-Fi router 24. The network 18 is configured to support Bluetooth™ technology, providing the mobile computing device 12 with the opportunity to communicate with a Bluetooth™-enabled device 26. Further, the network 20 supports communications within the infrared spectrum, thereby enabling the mobile computing device 12 to interact with an infrared device 28, such as a stereo receiver. However, to support such communications with the networks 14, 16, 18, and 20, the mobile computing device 12 includes circuit components individually configured to communicate with a particular communications technology.

Figure 2:
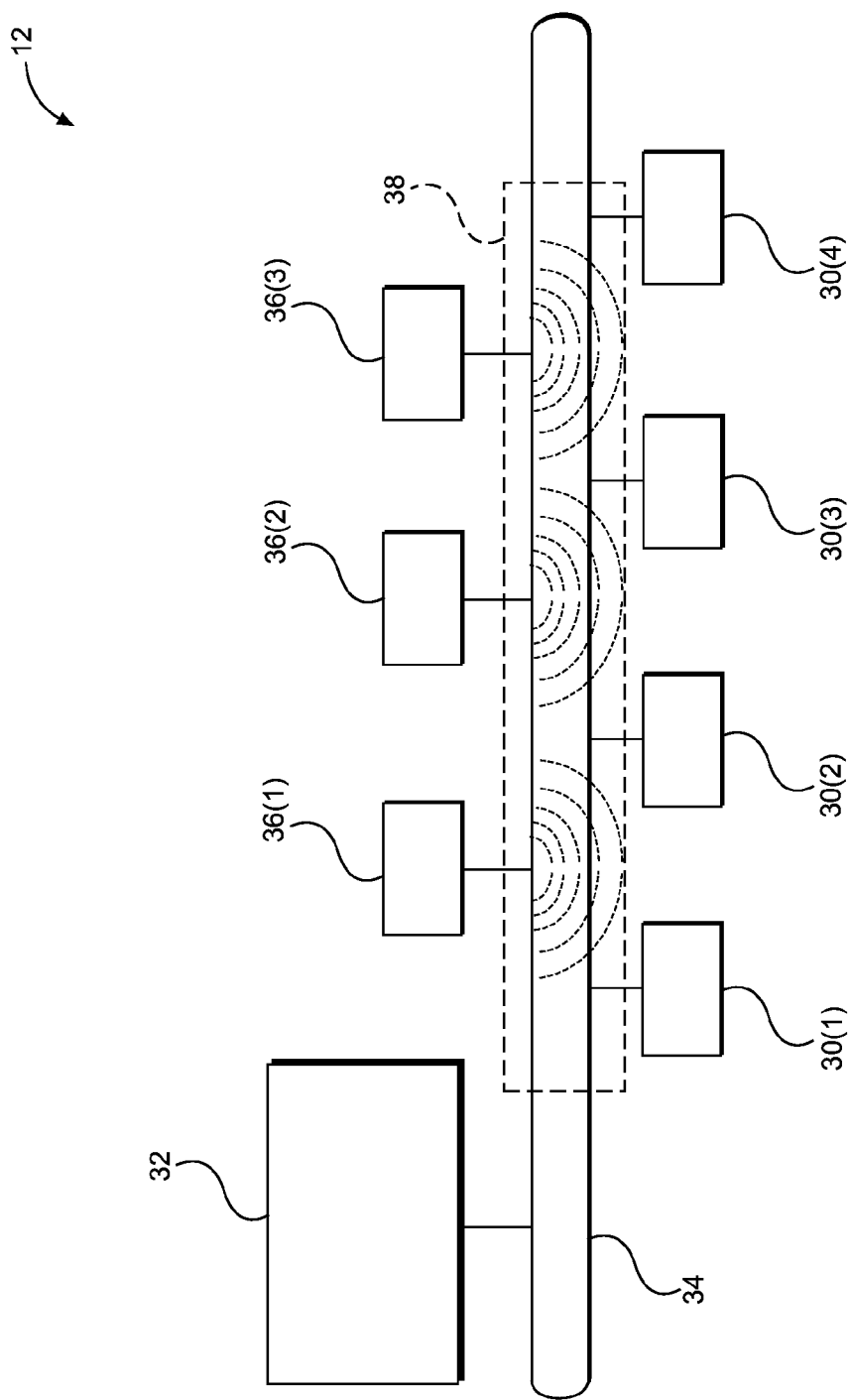
FIG. 2 is a simplified block diagram of internal circuitry of the mobile computing device of FIG. 1.

In this regard, FIG. 2 illustrates a simplified block diagram of the internal circuitry of the mobile computing device 12 of FIG. 1. More specifically, the mobile computing device 12 includes modems 30(1)-30(4), wherein each modem 30(1)-30(4) is configured to communicate with one of the networks 14, 16, 18, and 20 in FIG. 1. For example, the modem 30(1) is configured to conduct cellular communications with the network 14, while the modem 30(2) is configured to support Wi-Fi communications with the network 16. Further, the modem 30(3) supports communications via the Bluetooth™ protocol with the network 18, and the modem 30(4) provides infrared communications capability with the network 20. Each modem 30(1)-30(4) is coupled to a central processor 32 via a system bus 34, wherein the central processor 32 provides processing support for each of the respective modems 30(1)-30(4). In addition to communications functionality provided by the modems 30(1)-30(4), the mobile computing device 12 includes hardware application units 36(1)-36(3) coupled to the central processor 32 via the system bus 34. Each of the hardware application units 36(1)-36(3) enables the mobile computing device 12 to perform a corresponding non-modem-based function. For example, the hardware application unit 36(1) may be a camera, thereby enabling the mobile computing device 12 to take photographs. Further, the hardware application unit 36(2) may be a display that allows the mobile computing device 12 to display a video. Further, the hardware application unit 36(3) may be memory employed to store data necessary for the successful implementation of the functions within the mobile computing device 12.

With continuing reference to FIG. 2, although the hardware application units 36(1)-36(3) provide the mobile computing device 12 with a range of functionality, such circuitry may also degrade the performance of the modems 30(1)-30(4). More specifically, clock and data signals (not shown) are transferred between each hardware application unit 36(1)-36(3) and the central processor 32 over the system bus 34. Particularly at higher frequencies, these signals generate electromagnetic emissions 38 at each clock edge (not shown). Such electromagnetic emissions 38 cause EMI that degrades the operation of the modems 30(1)-30(4). For example, the EMI may alter the cellular, wireless, Bluetooth™, or infrared signals sent from and received by the modems 30(1)-30(4), respectively. Altering these signals may produce errors in the information exchanged between the modems 30(1)-30(4) and the corresponding networks 14, 16, 18, and 20, thus degrading performance.

Figure 3:
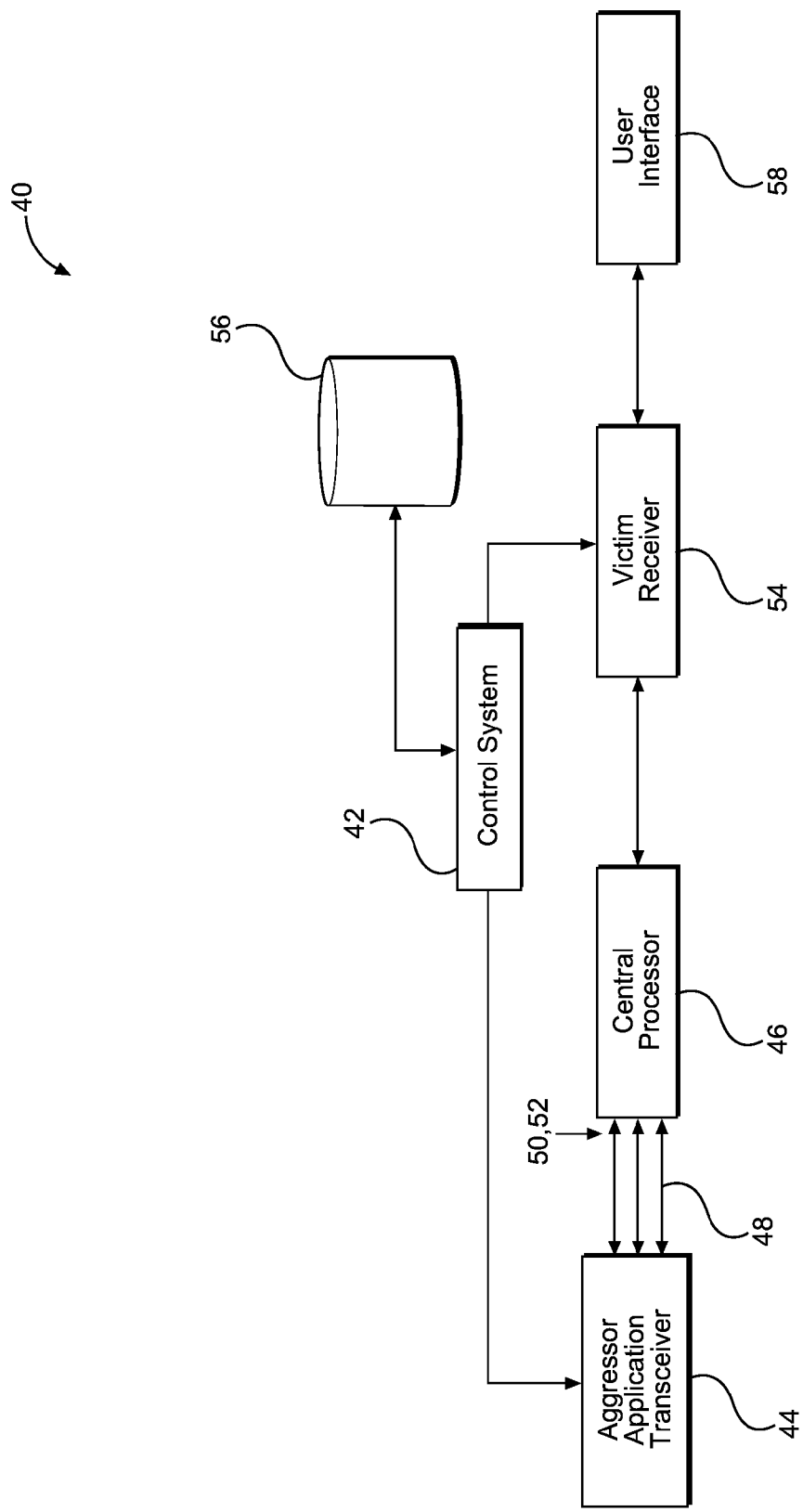
FIG. 3 is a block diagram of a computing device employing a control system configured to adjust parameters corresponding to an aggressor application transceiver to mitigate electromagnetic interference (EMI) experienced by a victim receiver.

In this regard, FIG. 3 illustrates a computing device 40 that employs a control system 42 configured to detect and mitigate EMI generated within the computing device 40. In particular, the control system 42 is configured to detect possible EMI conditions and adjust parameters within the computing device 40 to mitigate such EMI. The computing device 40 includes one or more aggressor application transceiver(s) 44 similar to the hardware application units 36(1)-36(3) of FIG. 2. For example, the one or more aggressor application transceiver(s) 44 may be one or more component(s) such as a camera, a display, or a memory. The aggressor application transceiver 44 is coupled to a central processor 46 via a wired interface 48. The wired interface 48 transfers clock signals 50 and data signals 52 between the aggressor application transceiver 44 and the central processor 46, wherein the clock signals 50 and the data signals 52 may have independent frequencies. Such signal activity over the wired interface 48 may generate EMI that degrades the performance of a victim receiver 54, wherein the victim receiver 54 is similar to the modems 30(1)-30(4) of FIG. 2. For example, the victim receiver 54 may be employed as a radio frequency (RF)

victim receiver, a wireless receiver, or any other type of receiver. In some aspects, the aggressor application transceiver 44 may generate EMI separate from the EMI generated by the wired interface 48. Notably, although only one (1) aggressor application transceiver 44 and one (1) victim receiver 54 are illustrated in FIG. 3, the computing device 40 may employ multiple aggressor application transceivers 44(1)-44(N) and victim receivers 54(1)-54(N).

With continuing reference to FIG. 3, the control system 42 is communicatively coupled to the aggressor application transceiver 44 and the victim receiver 54. This allows the control system 42 to detect if the victim receiver 54 is affected by EMI as a result of the wired interface 48 or the aggressor application transceiver 44. The control system 42 is also configured to analyze performance tradeoffs based on an acceptable performance level of the aggressor application transceiver 44 and the performance degradation experienced by the victim receiver 54. As described in more detail below, the control system 42 may be configured to gather information pertaining to such performance tradeoffs from a database 56 (sometimes referred to as a "coexistence manager"). Notably, the database 56 may be implemented in software, hardware, or a combination of both. Based on such analysis, the control system 42 is configured to adjust parameters associated with the aggressor application transceiver 44 to mitigate the EMI. Adjustment of these parameters may result in an increased or decreased performance level of the aggressor application transceiver 44. Such changes in the performance level may be evident to a user by way of a user interface 58 configured to display a visual output of various functions of the computing device 40. In this manner, the control system 42 provides designers with an additional tool that may reduce the performance degradation of the victim receiver 54 attributable to EMI.

Figure 4A:
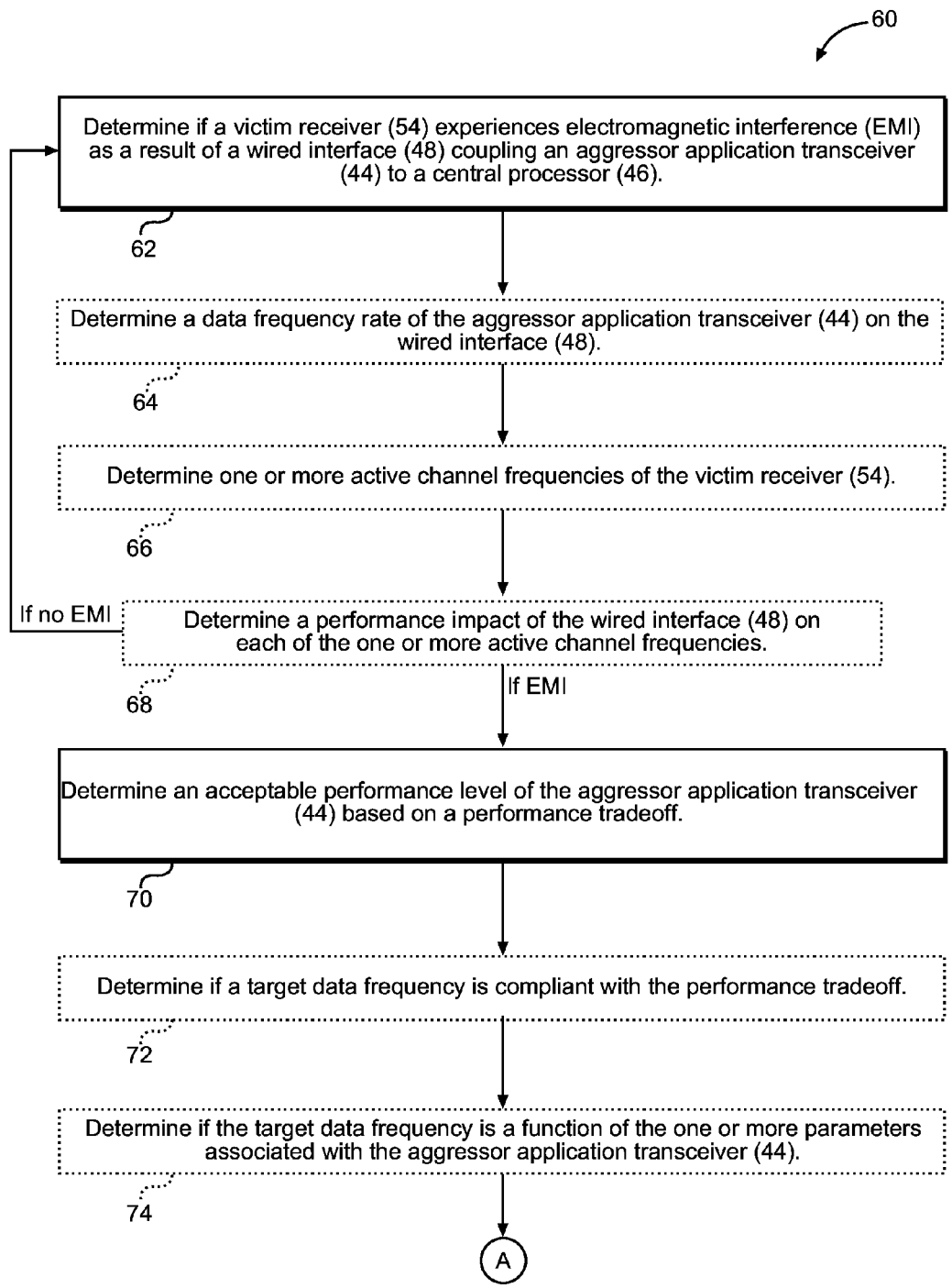
FIGS. 4A-4C are flowcharts illustrating an exemplary process for mitigating EMI of the victim receiver caused by the aggressor application transceiver in the computing device of FIG. 3.
Figure 4B:
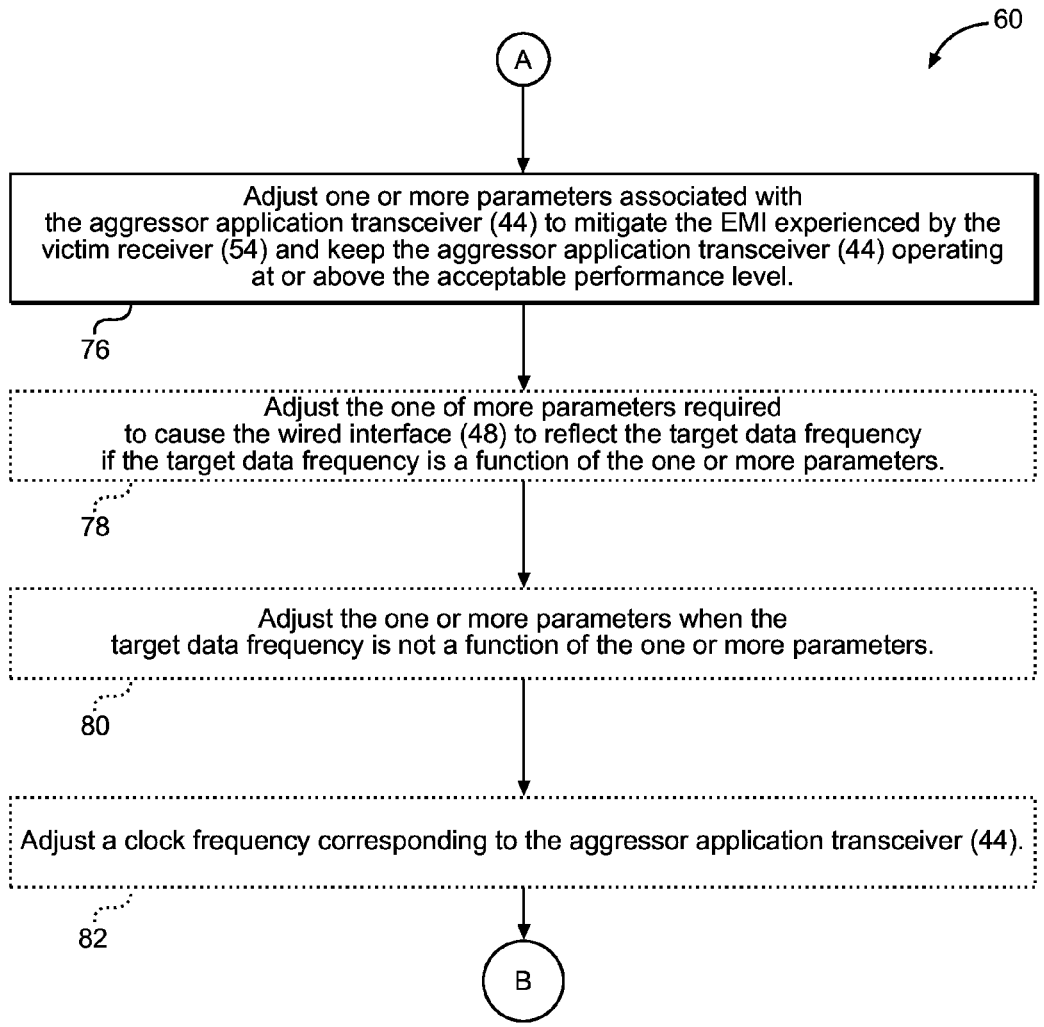
Figure 4C:
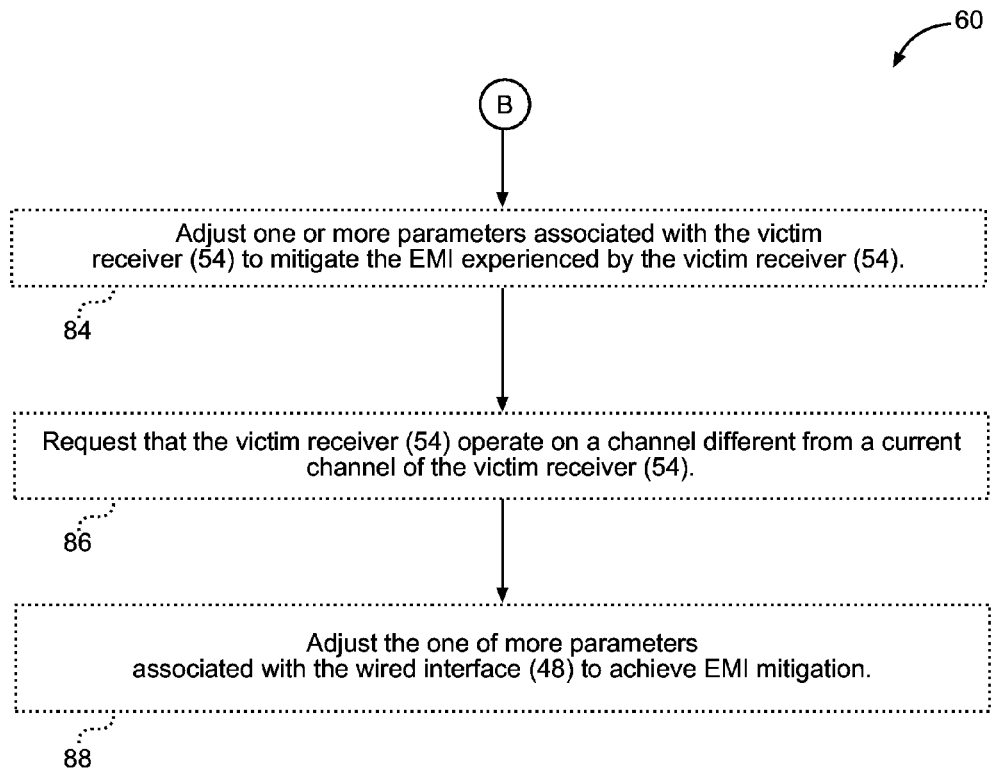

In this regard, FIGS. 4A-4C illustrate an exemplary process 60 employed by the control system 42 for mitigating EMI of the victim receiver 54 caused by the aggressor application transceiver 44 in the computing device 40 of FIG. 3. With reference to FIG. 4A, the control system 42 determines if the victim receiver 54 experiences EMI as a result of the wired interface 48 that couples the aggressor application transceiver 44 to the central processor 46 (block 62). Blocks 64-68 detail how the control system 42 makes such a determination in this aspect. Notably, other aspects may achieve similar results by performing the steps in a varying order, or by performing alternative steps. In this manner, to determine if the victim receiver 54 experiences EMI, the control system 42 determines a data frequency rate of the aggressor application transceiver 44 on the wired interface 48 (block 64). In addition to determining the data frequency rate in block 64, the control system 42 determines one or more active channel frequencies of the victim receiver 54 (block 66). For example, the victim receiver 54 may be configured to operate using multiple channel frequencies, wherein each channel frequency is employed for a specific function. The control system 42 then determines a performance impact of the wired interface 48 (e.g., the impact of resulting EMI) on each of the one or more active channel frequencies (block 68).

With continuing reference to FIG. 4A, if the control system 42 determines that the victim receiver 54 does not experience such EMI, the control system 42 continues to monitor the victim receiver 54 for evidence of EMI. However, if the control system 42 determines that the victim receiver 54 experiences EMI due to the wired interface 48, the control system 42 determines an acceptable performance level of the aggressor application transceiver 44 based on a performance tradeoff (block 70). For example, such a performance tradeoff may entail comparing how much performance degradation of the victim receiver 54 may be prevented in relation to certain data frequencies corresponding to the aggressor application transceiver 44. Notably, blocks 72-74 detail how the control system 42 makes such a determination in this aspect, but other aspects may achieve similar results by performing the steps in a varying order, or by performing alternative steps. In this manner, to determine the acceptable performance level, the control system 42 determines if a target data frequency is compliant with the performance tradeoff (block 72). Additionally, the control system 42 determines if the target data frequency is a function of the one or more parameters associated with the aggressor application transceiver 44 (block 74).

With reference to FIG. 4B, once the control system 42 determines the acceptable performance level described above, the control system 42 adjusts one or more parameters associated with the aggressor application transceiver 44 to mitigate the EMI experienced by the victim receiver 54 (block 76). In particular, the control system 42 adjusts these parameters in an attempt to keep the aggressor application transceiver 44 operating at or above the acceptable performance level. Such an acceptable performance level may be reflected on the user interface 58 corresponding to the aggressor application transceiver 44. Notably, blocks 78-82 detail how the control system 42 makes such adjustments in this aspect, but other aspects may achieve similar results by performing the steps in a varying order, or by performing alternative steps. In this manner, the control system 42 adjusts the one or more parameters required to cause the wired interface 48 to reflect the target data frequency if the target data frequency is a function of the one or more parameters (block 78). Further, the control system 42 may also adjust the one or more parameters when the target data frequency is not a function of the one or more parameters if doing so contributes to EMI mitigation without violating the previously described performance tradeoff (block 80). In addition to adjusting the parameters, the control system 42 may also adjust a clock frequency corresponding to the aggressor application transceiver 44 (block 82). For example, the control system 42 may adjust the clock frequency if adjusting the parameters does not achieve a sufficient level of EMI mitigation.

With reference to FIG. 4C, the control system 42 may adjust elements other than the parameters associated with the aggressor application transceiver 44 to mitigate the EMI. In this manner, the control system 42 may adjust one or more parameters associated with the victim receiver 54 to mitigate the EMI experienced by the victim receiver 54 (block 84). One such parameter may relate to a channel on which the victim receiver 54 currently operates. More specifically, the control system 42 may request that the victim receiver 54 operate on a channel different from the current channel of the victim receiver 54 (block 86). Further, the control system 42 may adjust one or more parameters associated with the wired interface 48 to achieve EMI mitigation (block 88). As non-limiting examples, such adjustable parameters associated with the wired interface 48 include frequency, slew rate, and voltage levels. By adjusting parameters associated with the aggressor application transceiver 44, the victim receiver 54, and the wired interface 48, the process 60 provides one aspect of the control system 42 that may reduce the performance degradation of the victim receiver 54 attributable to EMI.

In this regard, as non-limiting examples, the aggressor application transceiver 44 may be one of various components commonly employed in a mobile phone, computer tablet, or similar mobile device, such as a camera, a display, a touch screen fabric associated with the display, an audio device, a storage device, or a memory. If the aggressor application transceiver 44 is a camera, the associated parameters that may be adjusted include, but are not limited to, settings such as a number of megapixels, frames per second, bits per pixel, and blanking time. Further, if the aggressor application transceiver 44 is a display, the associated parameters that may be adjusted include, but are not limited to, settings such as bits per pixel, refresh rate, and resolution. If the aggressor application transceiver 44 is a memory, the associated parameters that may be adjusted include, but are not limited to, settings such as read rate, write rate, internal clock frequency, and refresh rate. If the aggressor application transceiver 44 is a touch screen fabric, which may be embedded within a display subsystem, the associated parameters that may be adjusted include, but are not limited to, touch sample rate, sample quantization, touch fabric physical node spacing, and touch screen controller interface frequency.

Additionally, as previously described, the control system 42 may retrieve information pertaining to the performance tradeoff from the database 56. In this regard, FIG. 5 illustrates an exemplary database entry 90 that may be used by the control system 42 of FIG. 3. Notably, the database entry 90 is configured to be compatible with the computing device 40 employing three (3) aggressor application transceivers 44(1)-44(3) and two (2) victim receivers 54(1)-54(2). Further, while the database entry 90 illustrates information stored in the database 56, other aspects may include database entries that utilize alternative information and formats. In this manner, the database entry 90 includes a column 92 that denotes which aggressor application transceiver 44(1)-44(3) corresponds to a particular row within the database entry 90. For example, in this aspect, a row 94 corresponds to a camera aggressor application transceiver 44(1); a row 96 corresponds to a display aggressor application transceiver 44(2); and a row 98 corresponds to a memory aggressor application transceiver 44(3). Further, a column 100 provides a first parameter (Parameter 1) of each corresponding aggressor application transceiver 44(1)-44(3), while a column 102 provides a second parameter (Parameter 2). A column 104 corresponding to a victim receiver 54(1) and a column 106 corresponding to a victim receiver 54(2) each indicates how to adjust either Parameter 1 or Parameter 2 of the corresponding aggressor application transceiver 44(1)-44(3) to achieve EMI mitigation within the performance tradeoff.

In this regard, the database entry 90 is configured so that the camera aggressor application transceiver 44(1) has a Parameter 1 associated with frame capture rate, while a Parameter 2 is associated with bits per pixel. Thus, if the EMI degrades the performance of the victim receiver 54(1), the database entry 90 indicates that the Parameter 1 (e.g., frame capture rate) of the camera aggressor application transceiver 44(1) may be changed from sixty (60) frames per second (fps) to fifty (50) fps to mitigate the EMI while also achieving the performance tradeoff. If EMI degrades the performance of the victim receiver 54(2), the database entry 90 indicates that the EMI may be mitigated while achieving the performance tradeoff by changing the Parameter 2 from thirty-six (36) bits per pixel (bpp) to twenty-four (24) bpp. The database entry 90 further indicates that the victim receiver 54(1) may have EMI associated with the display aggressor application transceiver 44(2) mitigated by adjusting the corresponding Parameter 2 (bits per pixel) from thirty-six (36) bpp to twenty-four (24) bpp. Further, the database entry 90 also indicates that the victim receiver 54(1) may have EMI associated with the memory aggressor application transceiver 44(3) mitigated by adjusting the corresponding Parameter 1 (internal clock frequency) from 433 MHz to 400 MHz.

Notably, while the discussion of aspects disclosed herein has focused on mitigating EMI associated with the aggressor application transceiver 44, it should be appreciated that some aspects may include multiple aggressor application transceivers 44, as alluded to previously. In this manner, if an aspect includes multiple aggressor application transceivers 44, the concepts of the present disclosure are readily extended to adjusting the parameters associated with the multiple aggressor application transceivers 44 to mitigate associated EMI.

Adjusting application parameters for interference mitigation according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computing device comprising:
   an aggressor application transceiver;
   a central processor communicatively coupled to the aggressor application transceiver via a wired interface;
   a victim receiver; and
   a control system communicatively coupled to the aggressor application transceiver and the victim receiver, configured to:
   determine if the victim receiver experiences electromagnetic interference (EMI) as a result of the wired interface;
   determine an acceptable performance level of the aggressor application transceiver based on a performance tradeoff; and
   adjust one or more parameters from among a plurality of parameters associated with the aggressor application transceiver to mitigate the EMI experienced by the victim receiver and keep the aggressor application transceiver operating at or above the acceptable performance level.

2. The computing device of claim 1, wherein the victim receiver comprises a radio frequency (RF) victim receiver.

3. The computing device of claim 1, wherein the victim receiver comprises a wireless receiver.

4. The computing device of claim 1, wherein the one or more parameters from among the plurality of parameters affect a user interface corresponding to the aggressor application transceiver.

5. The computing device of claim 4, wherein the user interface is configured to display a visual output affected by a performance level of the aggressor application transceiver.

6. The computing device of claim 1, wherein the aggressor application transceiver comprises a camera.

7. The computing device of claim 6, wherein the one or more parameters from among the plurality of parameters may be selected from the group consisting of: a number of megapixels; frames per second; bits per pixel; and blanking time.

8. The computing device of claim 1, wherein the aggressor application transceiver comprises a display.

9. The computing device of claim 8, wherein the one or more parameters from among the plurality of parameters may be selected from the group consisting of: bits per pixel; refresh rate; and resolution.

10. The computing device of claim 1, wherein the aggressor application transceiver comprises a memory.

11. The computing device of claim 10, wherein the one or more parameters from among the plurality of parameters may be selected from the group consisting of: read rate; write rate; internal clock frequency; and refresh rate.

12. The computing device of claim 1, wherein the aggressor application transceiver comprises a touch screen fabric.

13. The computing device of claim 12, wherein the one or more parameters from among the plurality of parameters may be selected from the group consisting of: touch sample rate; sample quantization; touch fabric physical node spacing; and touch screen controller interface frequency.

14. The computing device of claim 1, wherein the control system is further configured to determine if the victim receiver experiences EMI as a result of the aggressor application transceiver, wherein such EMI is separate from the EMI as a result of the wired interface.

15. A method for mitigating electromagnetic interference (EMI) of a victim receiver caused by an aggressor application transceiver, comprising:
    determining if a victim receiver experiences EMI as a result of a wired interface coupling an aggressor application transceiver to a central processor;
    determining an acceptable performance level of the aggressor application transceiver based on a performance tradeoff; and
    adjusting one or more parameters from among a plurality of parameters associated with the aggressor application transceiver to mitigate the EMI experienced by the victim receiver and keep the aggressor application transceiver operating at or above the acceptable performance level.

16. The method of claim 15, wherein determining if the victim receiver experiences EMI comprises determining a data frequency rate of the aggressor application transceiver on the wired interface.

17. The method of claim 16, wherein determining if the victim receiver experiences EMI further comprises determining one or more active channel frequencies of the victim receiver.

18. The method of claim 17, wherein determining if the victim receiver experiences EMI further comprises determining a performance impact of the wired interface on each of the one or more active channel frequencies.

19. The method of claim 15, wherein determining the acceptable performance level of the aggressor application transceiver comprises determining if a target data frequency is compliant with the performance tradeoff.

20. The method of claim 19, wherein determining the acceptable performance level of the aggressor application transceiver further comprises determining if the target data frequency is a function of the one or more parameters from among the plurality of parameters.

21. The method of claim 20, wherein adjusting the one or more parameters comprises adjusting the one or more parameters from among the plurality of parameters required to cause the wired interface to reflect the target data frequency.

22. The method of claim 21, wherein adjusting the one or more parameters comprises adjusting a clock frequency corresponding to the aggressor application transceiver.

23. The method of claim 21, wherein adjusting the one or more parameters comprises adjusting the one or more parameters from among the plurality of parameters when the target data frequency is not a function of the one or more parameters from among the plurality of parameters.

24. The method of claim 15, wherein adjusting the one or more parameters comprises adjusting the one or more parameters from among the plurality of parameters required to reflect the acceptable performance level on a user interface corresponding to the aggressor application transceiver.

25. The method of claim 15, further comprising adjusting one or more parameters from among a plurality of parameters associated with the victim receiver to mitigate the EMI experienced by the victim receiver.

26. The method of claim 25, wherein adjusting the one or more parameters associated with the victim receiver comprises requesting that the victim receiver operate on a channel different from a current channel of the victim receiver.

27. The method of claim 15, further comprising adjusting one or more parameters from among a plurality of parameters associated with the wired interface to mitigate the EMI experienced by the victim receiver.

28. The method of claim 27, wherein the one or more parameters from among the plurality of parameters associated with the wired interface may be selected from the group consisting of: frequency; slew rate; and voltage levels.

29. A mobile device comprising:
an aggressor camera;
a central processor communicatively coupled to the aggressor camera via a wired interface;
a victim receiver; and
a control system communicatively coupled to the aggressor camera and the victim receiver, configured to:
    determine if the victim receiver experiences electromagnetic interference (EMI) as a result of the wired interface;
    determine an acceptable performance level of the aggressor camera based on a performance tradeoff; and
    adjust one or more parameters from among a plurality of parameters associated with the aggressor camera to mitigate the EMI experienced by the victim receiver and keep the aggressor camera operating at or above the acceptable performance level.

30. A non-transitory computer-readable medium having stored thereon computer executable instructions which, when executed by a processor, cause the processor to:
    determine if a victim receiver experiences electromagnetic interference (EMI) as a result of a wired interface coupling an aggressor application transceiver to a central processor;
    determine an acceptable performance level of the aggressor application transceiver based on a performance tradeoff; and
    adjust one or more parameters from among a plurality of parameters associated with the aggressor application transceiver to mitigate the EMI experienced by the victim receiver and keep the aggressor application transceiver operating at or above the acceptable performance level.

* * * * *